United States Patent
Deliwala

(10) Patent No.: US 9,170,657 B2
(45) Date of Patent: Oct. 27, 2015

(54) ANGLE MEASUREMENT BY USE OF MULTIPLE ORIENTED LIGHT SOURCES

(75) Inventor: Shrenik Deliwala, Andover, MA (US)

(73) Assignee: ANALOG DEVICES, INC., Norwood, MA (US)

(*) Notice: Subject to any disclaimer, the term of this patent is extended or adjusted under 35 U.S.C. 154(b) by 187 days.

(21) Appl. No.: 13/570,691

(22) Filed: Aug. 9, 2012

(65) Prior Publication Data

US 2013/0128263 A1    May 23, 2013

Related U.S. Application Data

(60) Provisional application No. 61/560,962, filed on Nov. 17, 2011.

(51) Int. Cl.
 *G01B 11/26* (2006.01)
 *G06F 3/03* (2006.01)
 *G06F 3/0346* (2013.01)

(52) U.S. Cl.
 CPC ............ *G06F 3/0325* (2013.01); *G06F 3/0346* (2013.01)

(58) Field of Classification Search
 CPC .............................. G01B 11/26; G06F 3/0346
 USPC ........................................................ 356/138
 See application file for complete search history.

(56) References Cited

U.S. PATENT DOCUMENTS

| | | | |
|---|---|---|---|
| 6,271,831 B1* | 8/2001 | Escobosa et al. | 345/158 |
| 2007/0080940 A1 | 4/2007 | Aoki et al. | |
| 2007/0265075 A1 | 11/2007 | Zalewski | |
| 2010/0105475 A1 | 4/2010 | Mikhailov et al. | |
| 2010/0144436 A1 | 6/2010 | Marks et al. | |

OTHER PUBLICATIONS

PCT International Search Report and Written Opinion from PCT/US12/63636 mailed on Feb. 1, 2013.

* cited by examiner

*Primary Examiner* — Tarifur Chowdhury
*Assistant Examiner* — Omar Nixon
(74) *Attorney, Agent, or Firm* — Kenyon & Kenyon LLP

(57) ABSTRACT

Embodiments of the present invention may provide a relative angular motion measurement system that includes a remote device used to control operations of a host device. The remote may include a plurality of light sources with predetermined light distribution patterns and angles of orientation with respect to a major axis of the remote. The host device may include a sensor and a controller. The sensor may detect light emitted from the remote (via the light sources) and generate output signals that may be interpreted by the controller. The controller may interpret the output signals from the sensor to estimate received intensity from each light source and calculate the orientation of the remote device based on data representing the light sources' light distribution patterns with fixed angles of orientation.

21 Claims, 9 Drawing Sheets

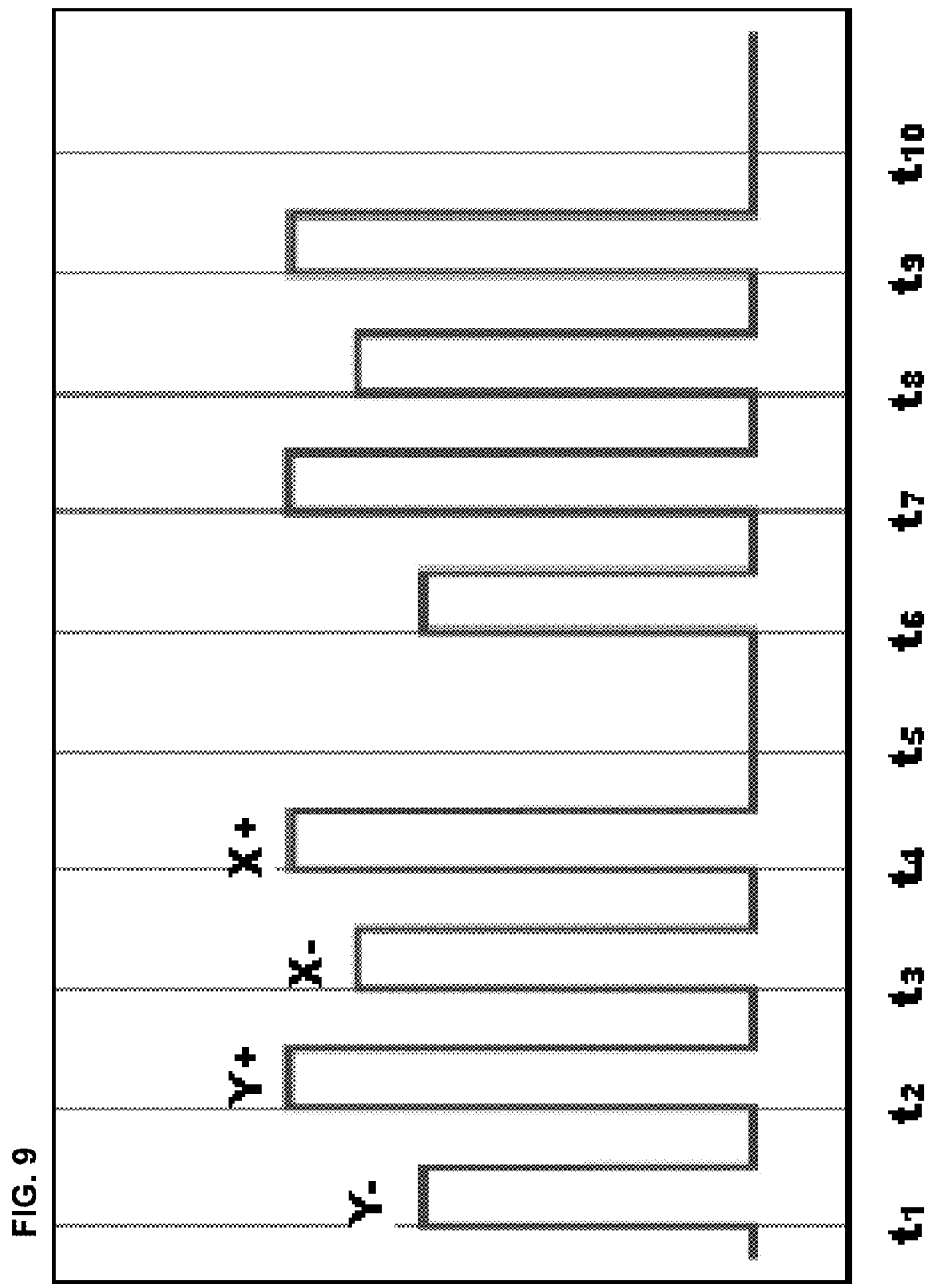

ANGLE MEASUREMENT BY USE OF MULTIPLE ORIENTED LIGHT SOURCES

RELATED APPLICATIONS

This application claims priority to provisional U.S. Patent Application Ser. No. 61/560,962, entitled "Angle Measurement by Use of Multiple Oriented Light Sources" filed on Nov. 17, 2011, the content of which is incorporated herein in its entirety.

BACKGROUND

There are currently several ways to measure relative angular motion in remotes and other similar devices. For example, micro electro-mechanical system (MEMS) based gyroscopes are regularly used to measure relative angular motion. These gyroscopes, however, suffer from drift errors and therefore are not ideal as absolute angle measurement devices. Another method involves utilizing a camera embedded in a remote device that measures angles by tracking external fixed light sources such as those found in gaming systems. Such a solution requires angular information to be transmitted back to the main console, TV, or computer for display and providing input to the user interface. Yet another method uses "centroid" tracking sensors using lateral photodiode(s). While all of the above systems provide measurement of angular orientation, they remain expensive for one or more of these reasons: use of MEMS, bulky lenses, or need for a communication backchannel. Thus, none of these techniques provide a precise angular measurement system that can be implemented with low-cost technology.

Hence, the inventor perceives a need in the art for an angular measurement system that may be implemented in a low cost manner. The inventor also perceives a need for a system that may be used as a controller of a host device, resembling a mouse device that can be used in free space to enter user commands to the host. Such a device may also be useful in measuring the orientation of machine parts for robotics and machine control.

BRIEF DESCRIPTION OF THE DRAWINGS

FIG. 9 is a graph illustrating output signals from a sensor in response to received light from a remote device driven with the driving patterns of FIG. 8.

DETAILED DESCRIPTION

Embodiments of the present invention provide a relative angular motion measurement system that may include a remote device used to control operations of a host device. The remote may include a plurality of light sources with predetermined light distribution patterns and angles of orientation with respect to a major axis of the remote. The light sources may be located on/in the remote and may emit light from the remote. The host device may include a light sensor and a controller. The light sensor may detect light emitted from the remote (via the light sources) and may generate output signals that may be interpreted by the controller. The controller may interpret the output signals from the light sensor to estimate received intensity from each light source and calculate the orientation of the remote device based on data representing the light sources' light distribution patterns with fixed angles of orientation.

Figure 1:
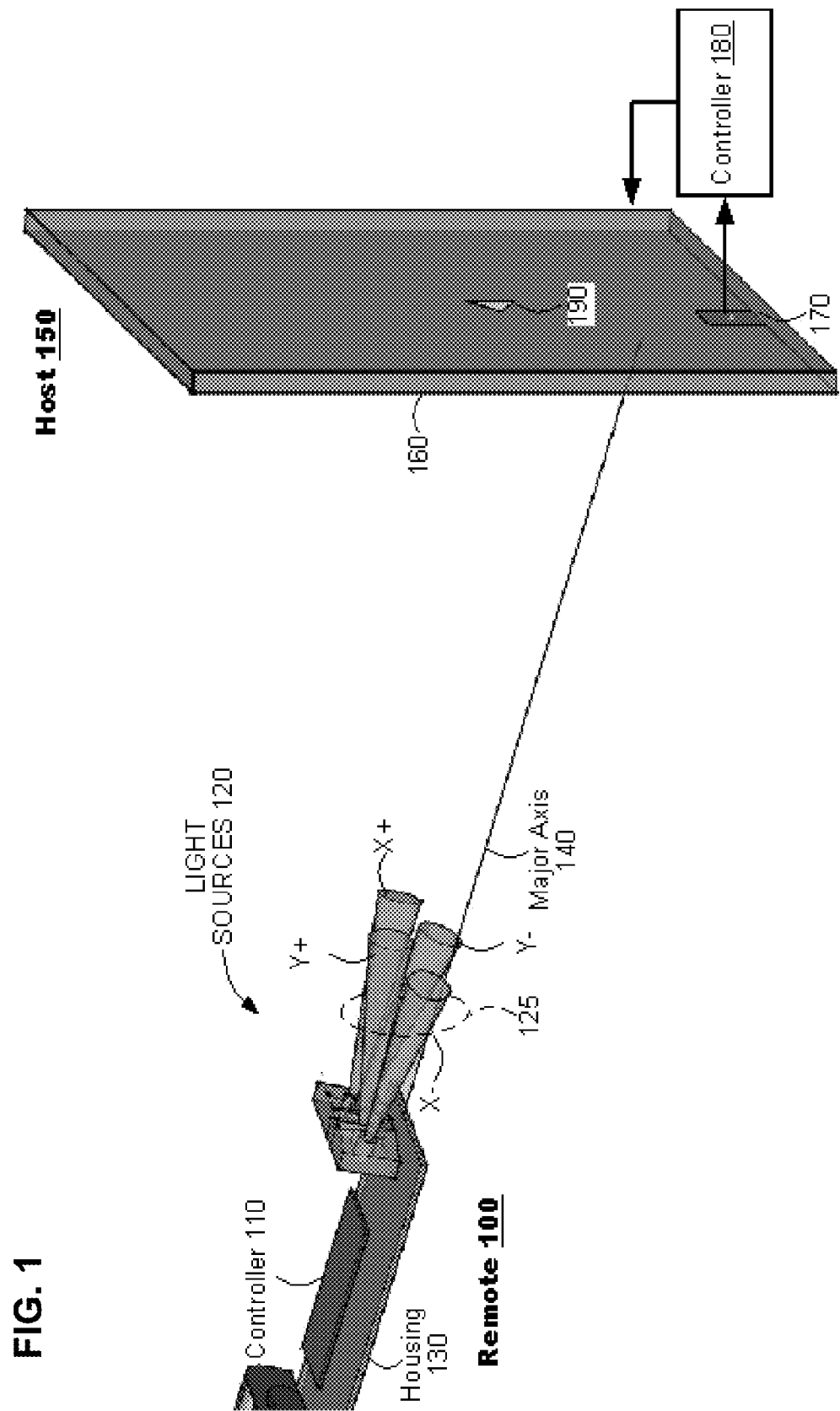
FIG. 1 is a simplified block diagram of an angular measurement system according to an embodiment of the present invention.

FIG. 1 is a simplified block diagram of an angular measurement system according to an embodiment of the present invention. The system may include a remote device 100 and a host device 150. The remote 100 may include a controller 110 and a plurality of light sources 120 provided within a common housing 130 (shown only partially in FIG. 1). The host device 150 may include a sensor 170 (which may be any type of optical sensor capable of sensing light intensities, such as a photodetector) and a controller 180.

The light sources 120 may be lasers, light emitting diodes (LEDs), lamps, reflectors that reflect light from another source, and the like. The light sources 120, each may have a known angular intensity distribution and unique orientation in space. Further, the light sources 120 each may be uniquely identified by modulation frequency, pulse positioning, or other discrimination techniques. The light sources 120 may also be capable of transmitting standard infra-red remote control codes along with providing information regarding its angular orientation with respect to the host device 150.

The controllers 110 and 180 may be on chip processors, controllers, or state machines that control operation of the remote 100 and the host 150. Such a machine may include, for example, any suitable processing platform, computing platform, computing device, processing device, computing system, processing system, computer, processor, or the like, and may be implemented using any suitable combination of hardware and/or software. The controller 110 (in the remote 100) may monitor user input (for example, a user pressing a button) and determine a corresponding output signal that may be sent to the host 150. The controller 180 may control the operations of the sensor 170, the display 190, and the cursor 190. Specifically, the controller 180 may be able to receive user input via sensor 70 (whether it be infra red signals associated with user commands or incident light used to determine the angular position of a user device) and manipulate the display 190 accordingly. The controller 180 may also be able to determine the angular orientation of the remote 100 (this process will be described in further detail below with respect to FIG. 4-7).

The remote 100 may include a variety of buttons and other user controls (not shown) through which a user may enter commands to control the host 150. The controller 180 may be capable of manipulating user elements on the display 160 based on both the commands and the angular orientation of the remote 100.

During operation, the plurality of light sources 120 may have predetermined light distributions 125 with respect to a major axis 140 of the remote 100. Specifically, each light source 120 may have its light distribution offset from the major axis 140 by an amount $\theta_i$ (not shown). The sensor 170 of the host device 150 may detect light emitted from the light sources 120 of the remote 100 and may generate output signals to be interpreted by the controller 180.

The controller 180 may subsequently interpret the output signals from the sensor 170 to determine the remote's angular orientation with respect to the host device 150 (this process will be described in further detail below with respect to FIGS. 4-6). Specifically, the controller 180 may compare relative light intensities of each of the light sources 120 and determine the orientation of the remote 100 with respect to the host 150. Subsequently, the controller 180 may control user elements on a display 160 (such as a cursor 190 on a display 160) or take other actions as determined by the rotation of the remote 100.

As discussed above with respect to FIG. 1, the remote 100 may have light sources 120 with predetermined light distributions. Various techniques to synthesize light source distributions may be used, including engineered diffusers, holographic and diffractive optics, beam homogenizers, lens systems and the like.

Figure 2:
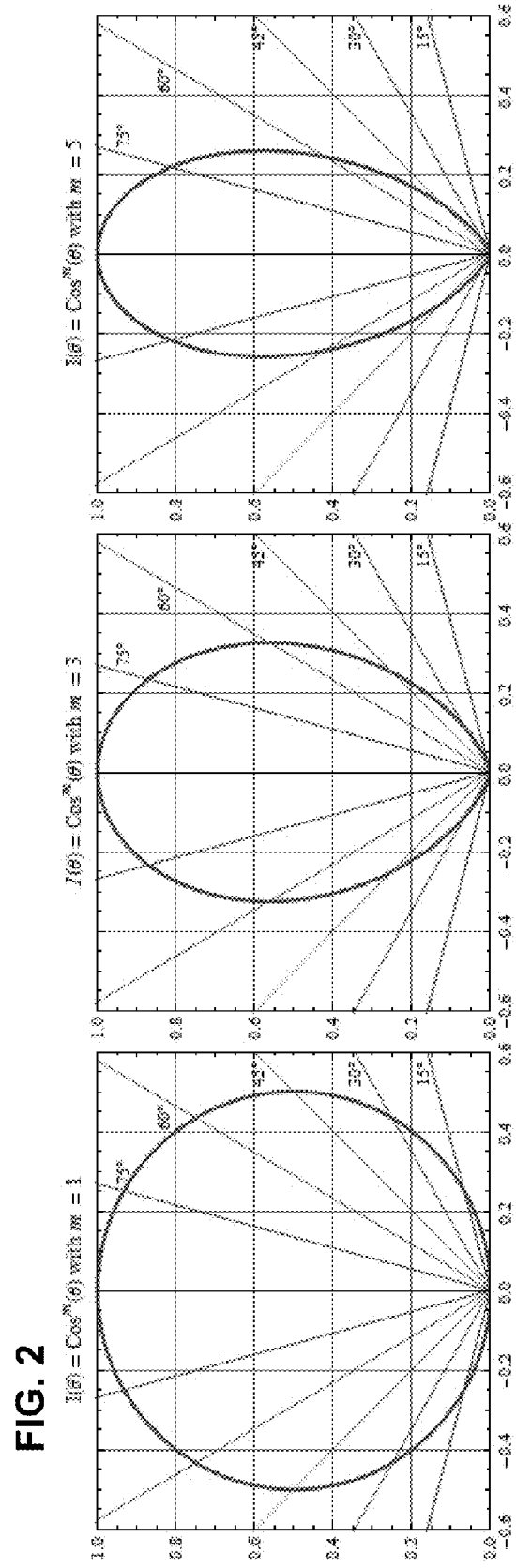
FIG. 2 illustrates several light source distributions that may be implemented in the several embodiments of the present invention.

FIG. 2 illustrates several exemplary light source light distributions that may be used, according to an embodiment of the present invention. The three examples of light source light distributions in FIG. 2 have light intensities defined by the equation $I(\theta)=(\cos(\theta))^m$, where I is the intensity of a light source, $\theta$ is the difference between the angle of orientation of a remote with respect to a face of a sensor and a predetermined angular offset (with respect to the main axis of a remote) of a light source, and m is a refractive index (which describes how the light propagates through a given medium) of the light source. The first graph shows a light distribution pattern of a light source with a refractive index (m) of one, the second graph shows a light distribution pattern of a light source with a refractive index of three, and the third graph shows a light distribution pattern of a light source with a refractive index of five. Any well characterized light source distribution can be used. The equations here are used for elucidating the principle of operation.

Figure 3:
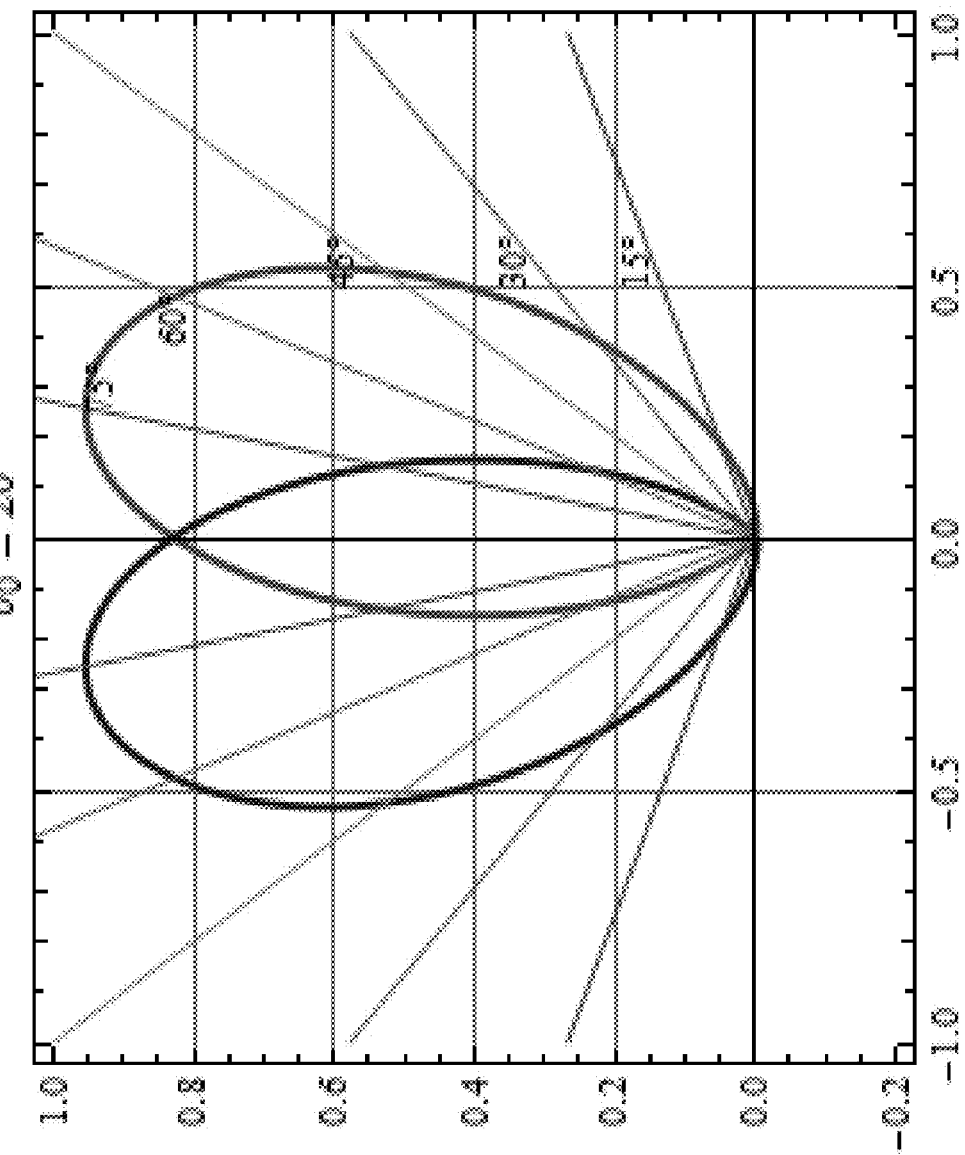
FIG. 3 illustrates a pair of light sources with different orientations that may be implemented in the several embodiments of the present invention.

When a pair of light sources is provided in the remote with different orientations, the light distributions of the light sources may occur as shown in FIG. 3. As depicted in FIG. 3, the two light sources are oriented on the same axis (or plane) and are offset (with respect to the main axis of a remote, for example) by an angle $\theta_0$ of 20° in opposite directions. Additionally, each light has a refractive index of three.

Figure 4:
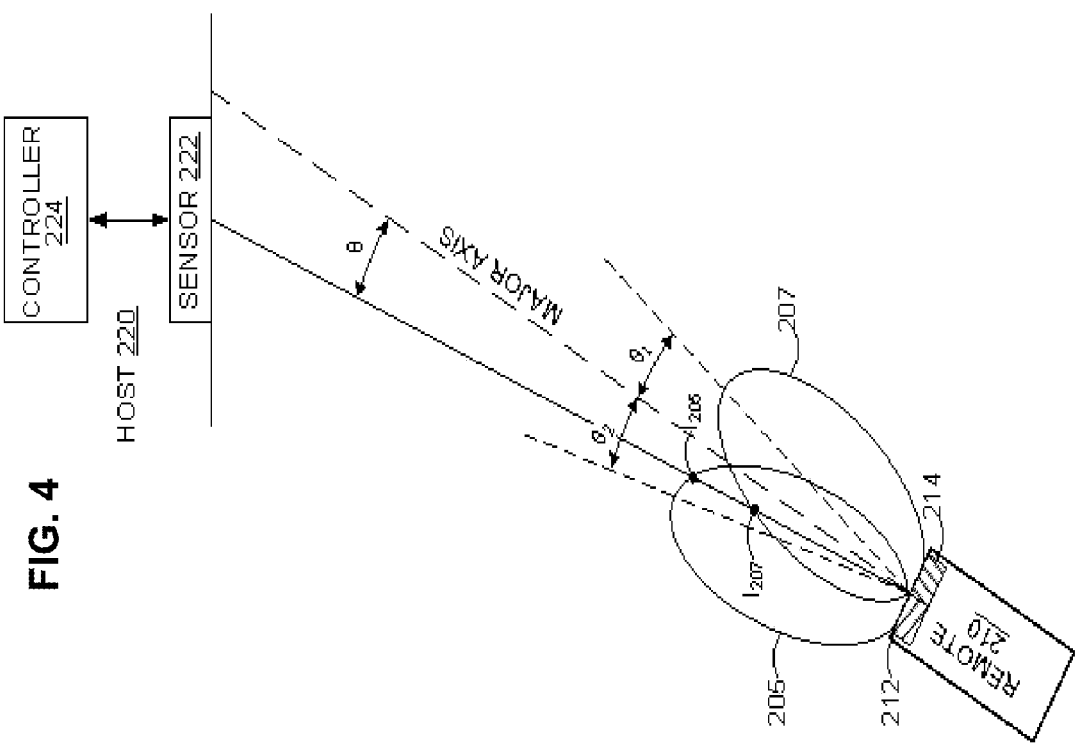
FIG. 4 is a simplified block diagram of an angular measurement system according to an embodiment of the present invention.

FIG. 4 illustrates an angular measurement system according to another embodiment of the present invention. The system may include a remote 210 and a host 220. The remote 210 includes two light sources 212 and 214. Host 220 may include a sensor 222 and a controller 224. The light sources 212 and 214 may have identical total light intensities and similar angular intensity distributions represented as 205 and 207, respectively. Each angular intensity distribution 205 and 207 may have a center that is offset from the major axis of the remote 210 by angles $\theta_1$ and $\theta_2$, respectively.

The light sources 212 and 214 may be lasers, light emitting diodes (LEDs), lamps, reflectors that reflect light from another sources, or the like. The light sources 212 and 214, each may have a known angular intensity distribution and unique orientation in space. Further, the light sources 212 and 214 each may be uniquely identified by signal encoding. For example, the light sources 212 and 214 may be distinguished by alternatively blinking them, pulse position coding, modulating them at different frequencies, pseudorandom binary sequences (PRBS) by pulse width modulation (PWM), or other signal encoding techniques to distinguish them.

When the remote 210 is directed or pointed at the sensor 222, the intensity measured by the sensor 222 from each light source 212 and 214 will depend on $\theta$ (the remote's 210 relative orientation with respect to the face of the sensor 222). By comparing the relative intensities, the controller 224 may deduce the orientation $\theta$ of remote 210 with respect to the face of sensor 222.

For example, consider the function $I(\phi)=(\cos(\phi))^m$, where I is the intensity of a light source, $\phi$ is the difference between the angle of orientation of a remote with respect to a face of a sensor ($\theta$) and the predetermined angular offset (with respect to the main axis of a remote) of a light source ($\theta_0$), and m is the refractive index of the light source. With respect to FIG. 4, the following equations may represent the ratio $r(\theta)$ of light distribution of light sources 212 and 214 based on an angle of incidence $\theta$ at sensor 222:

$$r(\theta) = \frac{I_1(\phi) - I_2(\phi)}{I_1(\phi) + I_2(\phi)} \text{ or}$$

$$r(\theta) = \frac{I_1(\theta - \theta_1) - I_2(\theta + \theta_2)}{I_1(\theta - \theta_1) + I_2(\theta + \theta_2)},$$

where $I_1$ and $I_2$ may represent measured light intensities of light sources 212 and 214, $\theta_1$ and $\theta_2$ may be the angles at which the angular intensity distribution 205 and 207 (which correspond to light sources 212 and 214, respectively) are offset from the main axis of the remote 210, and $\theta$ may be the orientation (or angle of incidence) of the remote device 210 with respect to the face of sensor 222.

In the system described with respect to FIG. 4, the light intensities $I_1$ and $I_2$ of light sources 212 and 214 may be known (because they are measured by sensor 222). Additionally angular distributions $\theta_1$ and $\theta_2$ may be predetermined. The controller 224 may therefore derive the angular orientation of the remote device 210 with respect to the face of sensor 222.

Figure 5:
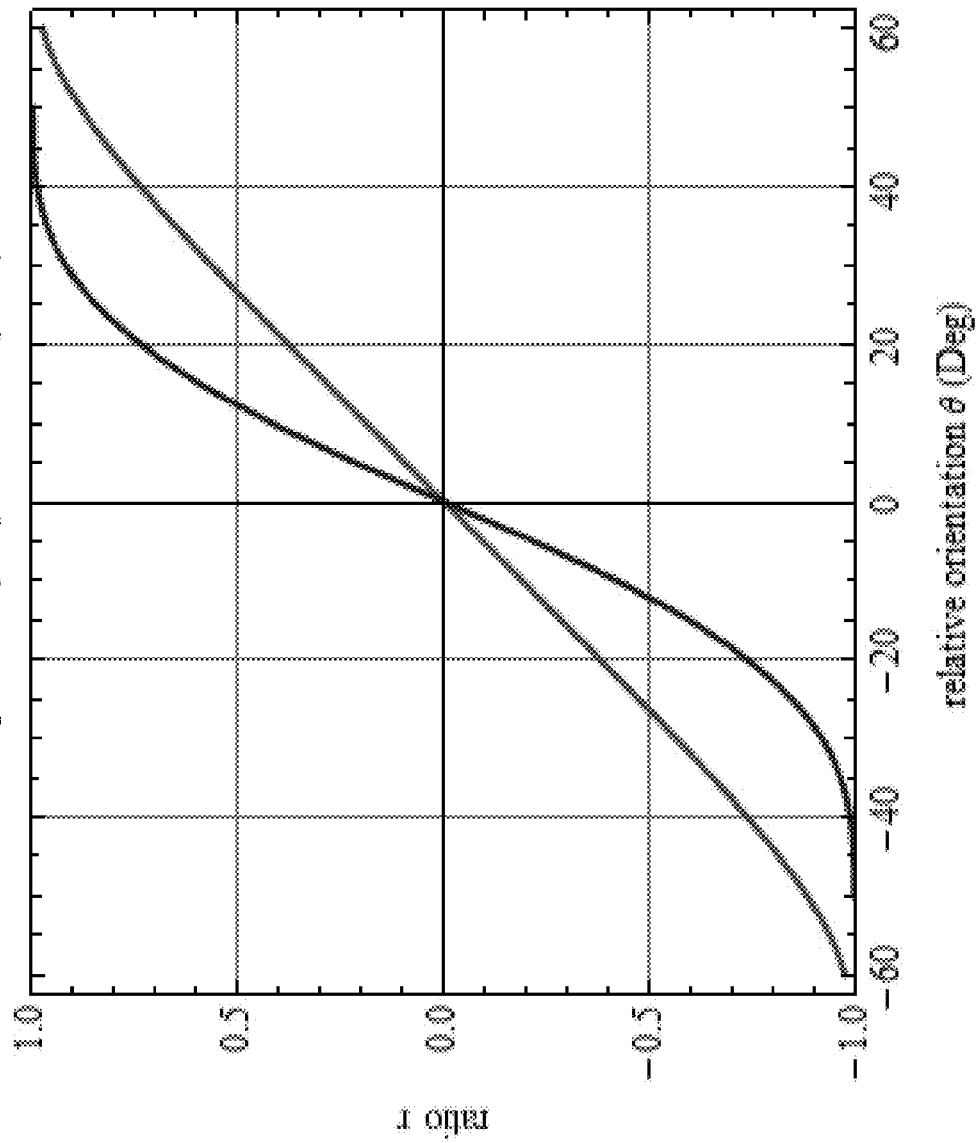
FIG. 5 illustrates light intensity ratio curves based on an angle of incidence at a light sensor according to an embodiment of the present invention.

FIG. 5 illustrates ratios $r(\theta)$ of light distributions based on an angle of incidence $\theta$ at a light sensor. The vertical axis represents the ratio $r(\theta)$ (defined by the equation above) of measured light intensities $I_1$ and $I_2$ of light sources 212 and 214. The horizontal axis represents the relative orientation (or angle of incidence) $\theta$ of the remote 210 with respect to the face of sensor 222. The graph contains two ratio curves. The first curve represents the ratio $r(\theta)$ of light intensities $I_1$ and $I_2$ where the refractive index (m) of the light sources 212 and 214 is three and the angular offset ($\theta_1$ and $\theta_2$, respectively) between each light source 212 and 214 and the main axis of remote 210 is 20°. The second curve represents the ratio $r(\theta)$ of light intensities $I_1$ and $I_2$ where the refractive index (m) of the light sources 212 and 214 is three and the angular offset ($\theta_1$ and $\theta_2$, respectively) between each light source 212 and 214 and the main axis of remote 210 is 40°.

The curves in FIG. 5 are for illustrative purposes only. More complex ratio equations similar to the equations above may be formed to "linearize" the ratio $r(\theta)$ versus the angular orientation of a remote with respect to a face of a sensor. Such a linearization may be preformed afterwards by many well-known methods once the "transfer curve" is known. Additionally, FIG. 5 presents an idealized case in which the total light intensity produced by the light sources 212 and 214 is identical. In practice, however, the intensities of light sources may not be identical, because of manufacturing defects, imbalances in drive current or construction of optics that house the light sources, etc.

Figure 6:
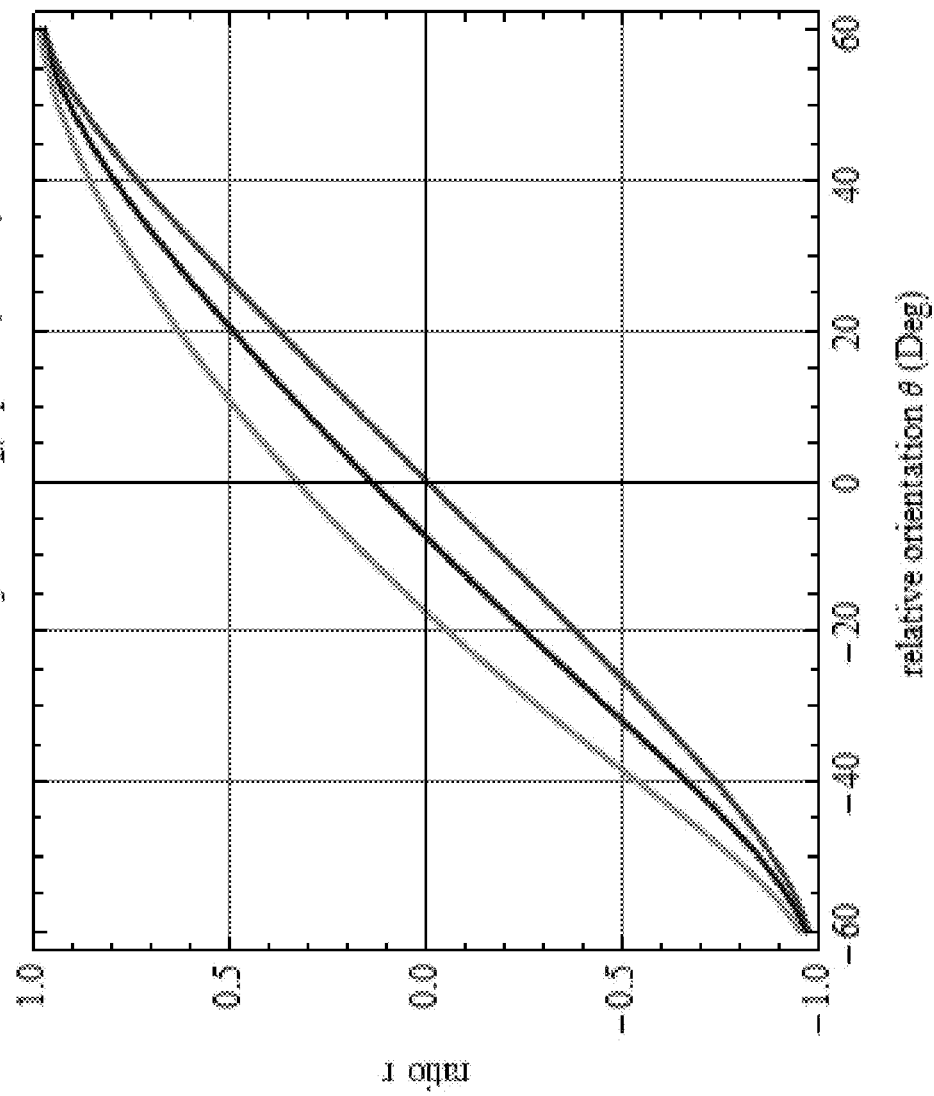
FIG. 6 illustrates the effects of light source variations on light intensity ratio curves based on an angle of incidence at a light sensor according to an embodiment of the present invention.

As shown in FIG. 6, such variations in light intensity may translate the ratio curve along the θ-axis. FIG. 6 illustrates ratios r(θ) of light distributions where $θ_o=20°$ and m=3 in three cases: when the total intensity ratio $I_2/I_1$=1, 0.75, and 0.5. These differences in the intensity ratios illustrated in FIG. 6 represent variations of light intensities of similar light sources 212 and 214 that may be caused by manufacturing defects, imbalances in drive current or construction of optics that house the light sources, etc. To account for these variances, user or field calibration may be easily carried out by orienting a remote 210 at a known angle and measuring the ratio r to remove the effect of unbalanced output from the light sources 212 and 214.

The angle measurement system described with respect to FIG. 4 may be modified to measure two angles of orientation $θ_x$ and $θ_y$. In such embodiments, a remote may include four light sources that are oriented along a pair of perpendicular axes (similar to the remote 100 in FIG. 1). The four light sources X+, X−, Y+, and Y− in FIG. 1 may be used to determine the angular orientation θ of the remote 100 in two dimensions. Specifically, angles $θ_x$ and $θ_y$ may be measured by comparing light intensities from each of the pairs of light sources X+, X− and Y+, Y− at the sensor 170.

For example, the X pair of light sources X+ and X− may have intensities $I_1$ and $I_2$. Similarly, the Y pair of light sources Y+ and Y− may have intensities $I_3$ and $I_4$. The light source pairs may be oriented as shown in FIG. 1 with each light source X+, X−, Y+, and Y− pointed away from the major axis 140 by a corresponding offset angle $θ_{x+}$, $θ_{x-}$, $θ_{y+}$, and $θ_{y-}$, respectively. In such an embodiment, the calculation of the ratios of intensities for each pair of light sources (X+, X− and Y+, Y−) may be done in a similar fashion to the one dimensional embodiment described with respect to FIG. 1. Specifically, the two resulting ratios may be:

$$r_x(θ_x) = \frac{I_1 - I_2}{I_1 + I_2} \text{ and}$$

$$r_y(θ_y) = \frac{I_3 - I_4}{I_3 + I_4},$$

where $r_x$ is the light distribution ratio in an X direction, $I_1$ is the light intensity of the light source X+, $I_2$ is the light intensity of the light source X−, $θ_x$ is the angular position of the remote 100 with respect to the face of sensor 170 in the X direction, $r_y$ is the light distribution ratio in a Y direction, $I_3$ is the light intensity of the light source Y+, $I_4$ is the light intensity of the light source Y−, and $θ_y$ is the angular position of the remote 100 with respect to the face of sensor 170 in the Y direction. Here, the light intensities $I_1$-$I_4$ are known and the corresponding offset angles $θ_{x+}$, $θ_{x-}$, $θ_{y+}$, and $θ_{y-}$ are predetermined. The controller 180 may therefore derive $θ_x$ and $θ_y$ to determine the remote's 100 two dimensional angular position with respect to the face of sensor 170.

Figure 7:
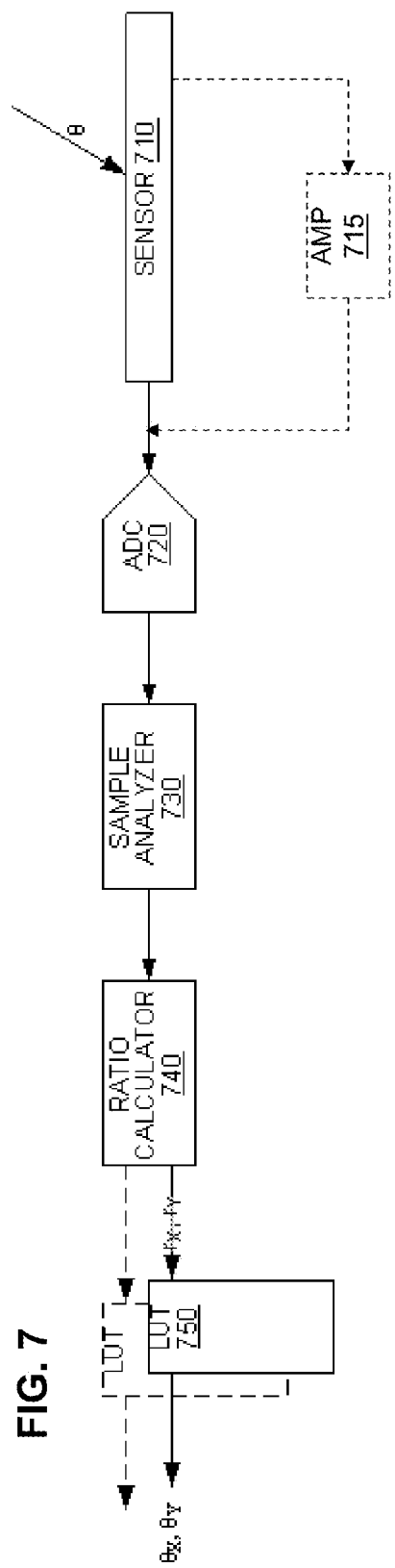
FIG. 7 is a functional block diagram of a host device according to an embodiment of the present invention.

FIG. 7 is a functional block diagram of a host device 700 according to an embodiment of the present invention. The host device may include a sensor 710, one or more amplifiers 715 and signal conditioning that may include an analog-to-digital converter (ADC) 720, a sample analyzer 730, a ratio calculator 740, and a look up table 750. The sensor 710 is similar to the sensor 170 in FIG. 1 and the sensor 222 in FIG. 4.

During operation, the sensor 710 may receive incident light from a remote with light sources (for example, four light sources can be provided in a remote as shown in FIG. 1) at an angle θ and may generate signals in response to the incident light (for example, electrical signals). The ADC 720 may convert these signals from sensor the 710 into digital values for processing by the sample analyzer 730. The sample analyzer 730 may convert the digital values output from ADC 720 into values representing the light intensities of the remote's light sources (for example, X+, X−, Y+, and Y− in FIG. 1). The ratio calculator 740 may subsequently calculate ratios $r_w$, $r_y$ of light intensities from each light source pair (for example, X+, X− and Y+, Y−) using the equations discussed above. Based on these ratios, the host device 700 may determine the angular values $θ_x$ and $θ_y$ by looking up corresponding transfer curves of the light source pairs indexed by the ratios $r_x$ and $r_y$.

When identical light sources are provided in a remote, a single look up table 750 may be sufficient to develop values of $θ_x$, $θ_y$ from ratio values $r_x$, $r_y$ developed by the ratio calculator 740. In some applications it may be useful to provide remotes with non-uniform light distributions; in such cases the host device 700 may include a pair of look up tables one for $r_x$ ratios and the other for $r_y$ ratios.

In the embodiment described with respect to FIG. 7, functionality of the ADC 720, sample analyzer 730, ratio calculator 740, and look up table 750 may be provided by a common controller integrated circuit (see FIG. 1).

Figure 8:
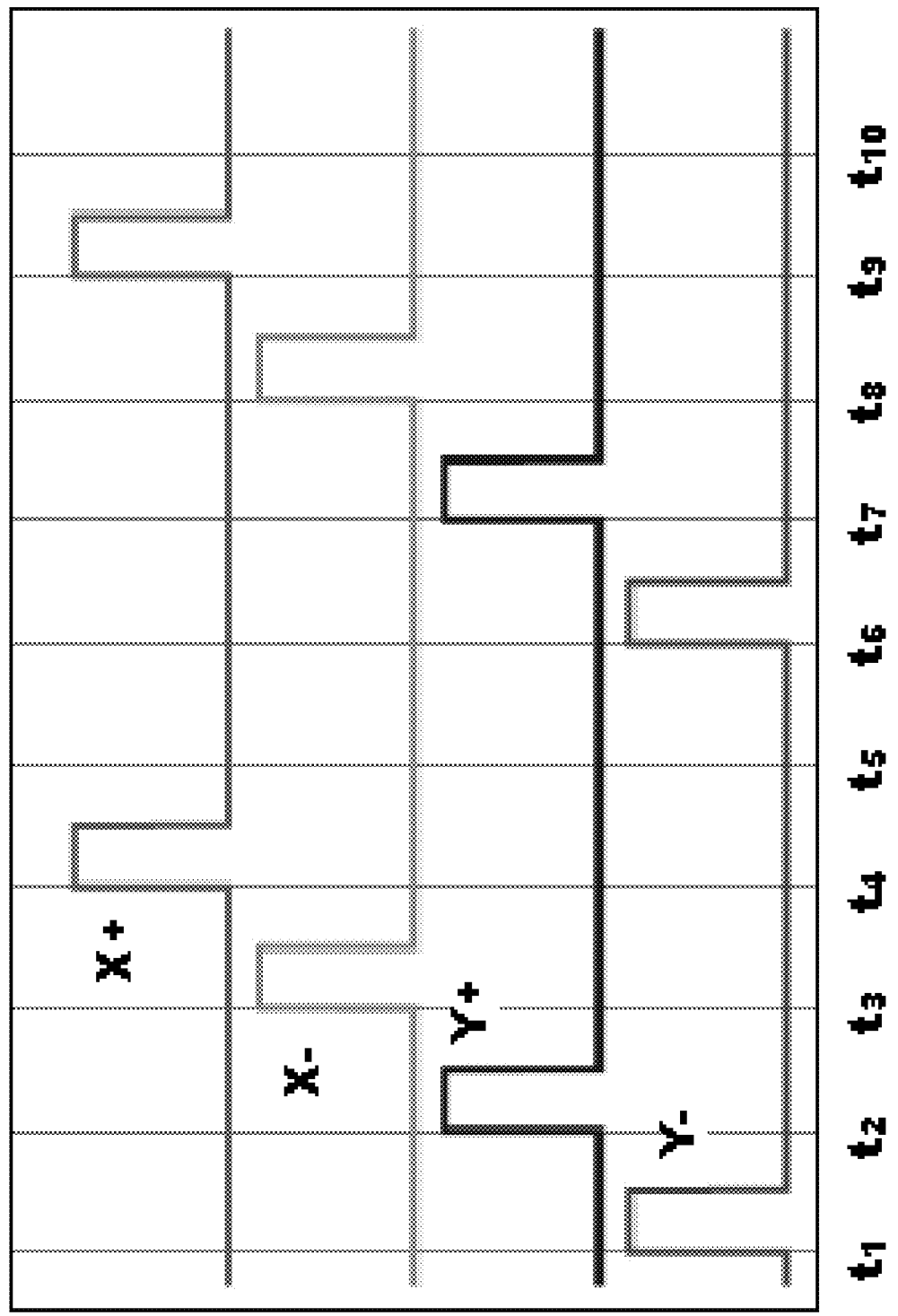
FIG. 8 is a graph illustrating a driving pattern used by a remote to drive a plurality of light sources according to an embodiment of the present invention.

FIGS. 8 and 9 illustrate exemplary driving patterns that may be used for the light sources 120 of FIG. 1. Specifically, FIG. 8 represents a driving pattern that may be used by the remote to drive a plurality of light sources X+, X−, Y+ and Y−. FIG. 9 represents exemplary output signals from a sensor that may receive light from a remote device driven with the driving patterns of FIG. 8.

As illustrated in FIG. 8, the different light sources X+, X−, Y+, Y− may be driven in different activation periods, shown at times $t_1$-$t_4$. After the last light source is driven (X+ in this example), a blank activation period may occur (time t5) in which none of the light sources are driven. Thereafter, the light sources may be driven in another cycle of operation shown as activation periods t6-t9.

FIG. 9 illustrates exemplary signals at the sensor. During the activation periods $t_1$-$t_4$ and t6-t9, light from each of the light sources may be received by the sensor. The intensity of the received light and, therefore, the magnitude of the output signal may vary based on the angle of orientation of the remote device (angle θ) and the distribution patterns of the light sources.

The blank activation periods t5 and t10 may define a null interval in the sensor's output, which may be used by the host device 700 (see FIG. 7) to sync to the driving pattern used by the remote. Typically, an ADC 720 (see FIG. 7) may sample the sensor's output at a sampling rate that exceeds the rate of the activation periods shown in FIGS. 8 and 9. Thus, the sample analyzer 730 (see FIG. 7) may review the ADC output to identify null intervals in the sensor's output and sync to the activation periods of the remote. The sample analyzer 730, therefore, may output values representing received intensities of the X+, X−, Y+ and Y− light sources which are then processed to derive ratio values $r_x$, $r_y$ and angular values $θ_x$, $θ_y$.

The driving patterns illustrated in FIGS. 8 and 9 are but one example of driving techniques available for use with the present invention. As noted, other methods such as PWM, applying different frequencies, etc., are available as alternative techniques. The selection of method may depend on ancillary design considerations such as expected interference from other sources both electrical and optical, estimated computing load to demodulate the signals, cost, and convenience.

In another embodiment, the determination of the two angles of orientation (in the X and Y direction) of a remote may be derived from only three light sources in the remote device. Consider three light sources oriented along a circle pointing outward by angle $\theta_0$. Each pair of light sources may be treated separately and a measurement of the ratio r between each of the pairs of light sources forming three independent ratio measures which are functions of orientations $\theta_x$ and $\theta_y$ may be taken. From these functions, orientations $\theta_x$ and $\theta_y$ can be calculated. Signal processing may be more complicated in this embodiment when compared to an embodiment using four light sources suggested above. The three light source embodiment may require more computation power but it may be more cost effective because it utilizes one less light source.

Although the foregoing techniques have been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Additionally, the embodiments described above may have application beyond the field of consumer electronic devices. For example, the angular measurement system may be utilized to determine the orientation of robotic arms. Those skilled in the art will appreciate that these techniques may be implemented in other ways without departing from the sprit and substantive features of the invention. The present embodiments are therefore to be considered in all respects as illustrative and not restrictive.

I claim:

1. A host device, comprising:
a light sensor; and
an analog to digital converter (ADC) coupled to the sensor;
a controller, comprising:
a sample analyzer to interpret output from the ADC and identify light intensity values corresponding to each light source of a plurality of light sources therefrom;
a ratio calculator to derive intensity ratios of the light intensity values corresponding to each of the light sources of the plurality of light sources; and
a look up table storing data representing light angle orientation values corresponding to associated light intensity ratios, wherein the light angle orientation values correspond to angles of orientation of a user device with respect to a face of the light sensor, wherein the user device includes the plurality of light sources, each of the angles of orientation being an angle between the major axis of the user device and an axis of light from the plurality of light sources incident on the face of the light sensor, wherein the light sensor is distinct from the user device.

2. The host device of claim 1, wherein the controller that is programmed to operate the sensor, the ADC, the sample analyzer, and the look up table to determine an angular position of a user device emitting the light sensed by the sensor.

3. The host device of claim 1, wherein the controller is programmed to manipulate a display based on the angular position of the user device emitting the light sensed by the sensor.

4. The host device of claim 1, further comprising an amplifier coupled between the ADC and the light sensor.

5. An angular measurement system, comprising:
a light sensor, and
a controller to calculate an angle of orientation of a user device with respect to a face of the light sensor, wherein the user device includes a plurality of light sources, the controller comprising a look up table storing data representing light angle orientation values corresponding to associated light intensity ratios, wherein the light angle orientation values correspond to angles of orientation of the user device with respect to the face of the light sensor, wherein the angle of orientation is calculated based on the light intensity signals generated by the light sensor in response to light received from each light source of the plurality of light sources, the angle of orientation being an angle between the major axis of the user device and an axis of light from the plurality of light sources incident on the face of the light sensor, wherein the light sensor is distinct from the user device.

6. The angular measurement system of claim 5, wherein the user device is a remote device.

7. The angular measurement system of claim 5, wherein the plurality of light sources are light emitters.

8. The angular measurement system of claim 5, wherein the plurality of light sources are reflectors.

9. The angular measurement system of claim 5, wherein light from each light source is modulated by respective signal encoding.

10. The angular measurement system of claim 5, wherein the controller is programmed to calculate the angle of orientation by comparing the light intensities of each light source.

11. The angular measurement system of claim 10, wherein the a look up table stores orientation values indexable by light ratio values obtained by the controller's comparisons.

12. An angular measurement system, comprising:
a light sensor and
a controller to calculate a horizontal angle of orientation of a user device with respect to a face of the light sensor, wherein the user device includes a plurality of light sources, the controller comprising a look up table storing data representing light angle orientation values corresponding to associated light intensity ratios, wherein the light angle orientation values correspond to angles of orientation of the user device with respect to the face of the light sensor, wherein the horizontal angle of orientation is calculated based on the light intensity data corresponding to a first pair of light sources of the plurality of light sources and a vertical angle of orientation of the user device with respect to the face of the light sensor, wherein the vertical angle of orientation is calculated based on the light intensity data corresponding to a second pair of light sources of the plurality of light sources, the horizontal angle of orientation being a horizontal angle between the major axis of the user device and an axis of light, from the first pair of light sources, incident on the face of the light sensor, and the vertical angle of orientation being a vertical angle between the major axis of the user device and an axis of light, from the second pair of light sources, incident on the face of the light sensor, wherein the light sensor is distinct from the user device.

13. The angular measurement system of claim 12, wherein the user device is a remote device.

14. The angular measurement system of claim 12, wherein the plurality of light sources are light emitting diodes, lasers, or lamps.

15. The angular measurement system of claim 12, wherein each light source is uniquely identified by signal encoding.

16. The angular measurement system of claim 12, wherein the controller is programmed to calculate the horizontal angle of orientation by comparing the light intensities of each of the first pair of light sources and to calculate the vertical angle of orientation by comparing the light intensities of each of the second pair of light sources.

17. The angular measurement system of claim 12, wherein the controller includes an amplifier, an analog-to-digital converter (ADC), a sample analyzer, and a ratio calculator;
    wherein an output of the light sensor is coupled to the amplifier which is coupled to the ADC,
    the sample analyzer is coupled to an output of the ADC and is capable of outputting light intensity values representing the light intensities of each light source, and
    the ratio calculator is coupled to an output of the sample analyzer and is capable of calculating a horizontal ratio of light intensity values of the first pair of light sources and a vertical ratio of light intensity values of the second pair of light sources.

18. The angle measurement system of claim 12, wherein the controller is programmed to calculate the horizontal angle of orientation of the user device based on corresponding horizontal ratio values in the look up table and the vertical angle of orientation of the user device based on corresponding vertical ratio values in the look up table.

19. A method for measuring angular orientation of a user device, comprising: generating electrical signals from light from a plurality of light sources located at a common light sensor, identifying from the electrical signals, signal components corresponding to each of the light sources, comparing signal components of paired light sources to each other, based on the comparison, retrieving, from a look up table, angle of orientation data corresponding to the compared signal components, and determining an angle of orientation of the user device with respect to a face of the sensor, the angle of orientation being an angle between a major axis of the user device and an axis of the light from the plurality of light sources incident on the face of the sensor, wherein the light sensor is distinct from the user device.

20. The method of claim 19, wherein the comparing step comprises:
    comparing signal components of a first pair of light sources provided on a first common axis to each other but with a first predetermined angular offset from each other, and
    comparing signal components of a second pair of light sources provided on a second common axis to each other but with a second predetermined angular offset from each other.

21. The method of claim 19, wherein
    the comparing step includes deriving a ratio of light intensities from the signal components of the paired light sources,
    the determining step comprises retrieving angle of orientation data from a look up table indexed by the derived ratio.

* * * * *